United States Patent
Stauffer

(10) Patent No.: US 9,923,242 B2
(45) Date of Patent: *Mar. 20, 2018

(54) LITHIUM BROMIDE BATTERY

(71) Applicant: John E. Stauffer, Greenwich, CT (US)

(72) Inventor: John E. Stauffer, Greenwich, CT (US)

(*) Notice: Subject to any disclaimer, the term of this patent is extended or adjusted under 35 U.S.C. 154(b) by 306 days.

This patent is subject to a terminal disclaimer.

(21) Appl. No.: 14/161,803

(22) Filed: Jan. 23, 2014

(65) Prior Publication Data

US 2015/0207175 A1   Jul. 23, 2015

(51) Int. Cl.
| | |
|---|---|
| *H01M 10/0568* | (2010.01) |
| *H01M 10/0569* | (2010.01) |
| *H01M 10/052* | (2010.01) |
| H01M 4/587 | (2010.01) |

(52) U.S. Cl.
CPC ..... *H01M 10/0568* (2013.01); *H01M 10/052* (2013.01); *H01M 10/0569* (2013.01); *H01M 4/587* (2013.01); *H01M 2300/0028* (2013.01); *H01M 2300/0037* (2013.01)

(58) Field of Classification Search
CPC ......... H01M 10/0568; H01M 10/0569; H01M 2300/0028; H01M 10/0564; H01M 4/583; H01M 4/625; H01M 10/056; H01M 2300/0037; H01M 4/587; H01M 10/052
USPC .............................. 429/339, 341, 231.8, 343
See application file for complete search history.

(56) References Cited

U.S. PATENT DOCUMENTS

| | | |
|---|---|---|
| 145,494 A | 12/1873 | Duval |
| 195,511 A | 9/1877 | Jones |
| 300,900 A | 6/1884 | Saum |
| 317,082 A | 5/1885 | Boyle |
| 343,367 A | 6/1886 | Froome |
| 346,619 A | 8/1886 | Schall |
| 3,833,427 A | 9/1974 | Land et al. |
| 3,862,261 A | 1/1975 | Stoddard |
| 3,862,861 A | 1/1975 | McClelland et al. |
| 3,862,862 A | 1/1975 | Gillibrand et al. |
| 3,887,399 A | 6/1975 | Seiger |
| 3,964,927 A | 6/1976 | Villarreal-Dominguez |
| 3,976,509 A | 8/1976 | Tsai et al. |
| 4,076,909 A | 2/1978 | Lindstrom |
| 4,079,174 A | 3/1978 | Beck et al. |
| 4,107,407 A | 8/1978 | Koch |
| 4,268,589 A | 5/1981 | Tamminen |
| 4,269,911 A | 5/1981 | Fukuoka et al. |

(Continued)

FOREIGN PATENT DOCUMENTS

| | | |
|---|---|---|
| EP | 0091520 A1 | 10/1983 |
| JP | 2009266675 A | 11/2009 |
| WO | WO2015112855 A1 | 7/2015 |

OTHER PUBLICATIONS

CAMEO Chemicals (propylene glycol) http://cameochemicals.noaa.gov/chemical/9002, date unknown.

(Continued)

*Primary Examiner* — Jonathan Jelsma
*Assistant Examiner* — Omar Kekia
(74) *Attorney, Agent, or Firm* — Young Basile Hanlon & MacFarlane, P.C.

(57) ABSTRACT

A rechargeable battery is provided such that the positive electrode comprises graphite, the negative electrode also comprises graphite, and the electrolyte is a solution of lithium bromide in an ester of succinic acid or an ester of glutaric acid.

7 Claims, 1 Drawing Sheet

(56) References Cited

U.S. PATENT DOCUMENTS

| | | | |
|---|---|---|---|
| 4,327,157 A | 4/1982 | Himy et al. | |
| 4,352,869 A | 10/1982 | Mellors | |
| 4,830,718 A | 5/1989 | Stauffer | |
| 4,849,310 A | 7/1989 | Schlaikjer | |
| 5,034,291 A | 7/1991 | Jacus | |
| 5,264,298 A | 11/1993 | Townsend | |
| 5,344,528 A | 9/1994 | Bossler et al. | |
| 5,346,783 A | 9/1994 | Tomantschger et al. | |
| 5,462,821 A | 10/1995 | Onoue et al. | |
| 5,512,144 A | 4/1996 | Stauffer | |
| 5,599,637 A | 2/1997 | Pecherer et al. | |
| 5,641,591 A | 6/1997 | Kawakami et al. | |
| 5,705,050 A | 1/1998 | Sampson et al. | |
| 6,010,604 A | 1/2000 | Stauffer | |
| 6,117,196 A | 9/2000 | Snyder et al. | |
| 6,139,989 A * | 10/2000 | Kawakubo | H01M 4/13 429/217 |
| 6,183,914 B1 | 2/2001 | Yao et al. | |
| 6,235,167 B1 | 5/2001 | Stauffer | |
| 6,787,265 B2 | 9/2004 | Phillips | |
| 7,947,391 B2 | 5/2011 | Stauffer | |
| 8,785,057 B1 * | 7/2014 | Smith | H01G 11/58 429/336 |
| 8,927,143 B2 | 1/2015 | Stauffer | |
| 8,940,445 B2 | 1/2015 | Stauffer | |
| 9,147,912 B2 | 9/2015 | Stauffer | |
| 2002/0068222 A1 | 6/2002 | Ishii et al. | |
| 2002/0106560 A1 | 8/2002 | Kolb et al. | |
| 2003/0190524 A1 | 10/2003 | Phillips | |
| 2004/0033191 A1 | 2/2004 | Wietelmann et al. | |
| 2007/0009771 A1 | 1/2007 | Leddy et al. | |
| 2007/0111096 A1 | 5/2007 | Kobayashi et al. | |
| 2007/0134553 A1 | 6/2007 | Kobayashi et al. | |
| 2007/0190410 A1 | 8/2007 | Kobayashi et al. | |
| 2008/0096078 A1 | 4/2008 | Miyake | |
| 2009/0053596 A1 | 2/2009 | Stauffer | |
| 2009/0169978 A1 | 7/2009 | Smith et al. | |
| 2010/0047697 A1 | 2/2010 | Stauffer | |
| 2010/0099018 A1 | 4/2010 | Kawase et al. | |
| 2010/0178569 A1 * | 7/2010 | Ihara | H01M 4/133 429/325 |
| 2010/0261053 A1 | 10/2010 | Stauffer | |
| 2011/0171536 A1 | 7/2011 | Oki et al. | |
| 2011/0262803 A1 | 10/2011 | Huang et al. | |
| 2011/0274988 A1 | 11/2011 | Fan et al. | |
| 2012/0171574 A1 | 7/2012 | Zhamu et al. | |
| 2013/0045415 A1 | 2/2013 | Stauffer | |
| 2013/0216922 A1 * | 8/2013 | Zheng | H01M 4/9041 429/405 |
| 2013/0224607 A1 * | 8/2013 | Ihara | H01M 10/0569 429/338 |
| 2013/0252083 A1 | 9/2013 | Stauffer | |
| 2014/0017571 A1 * | 1/2014 | Lockett | H01M 2/164 429/301 |

OTHER PUBLICATIONS

Chemical Book 2008. Poly(propylene glycol) Basic information. Http://www.chemicalbook.com/ProductChemicalPropertiesCB4123367_EN.htm.

Dickey et al., "Eutectic Gallium-Indium (EgaIn): A Liquid Metal Alloy for the Formation of Stable Structures in Microchannels at Room Temperature," Adv. Funct. Mater., 2008, 18, pp. 1097-1104.

International Search Report and Written Opinion from related application; PCT/US2015/012674 dated Apr. 24, 2015, 9 pages.

Investigations of an Alkaline Electrolyte for Zn—Pb02 Cells, dated Jul. 1, 1973, Journal of the Electrochemical Society Electrochemical society, Manchester, New Hampshire, US, vol. 120, No. 7, pp. 855-857, ISSN:0013-4651.

U.S. Appl. No. 14/337,388, filed Jul. 22, 2014.

* cited by examiner

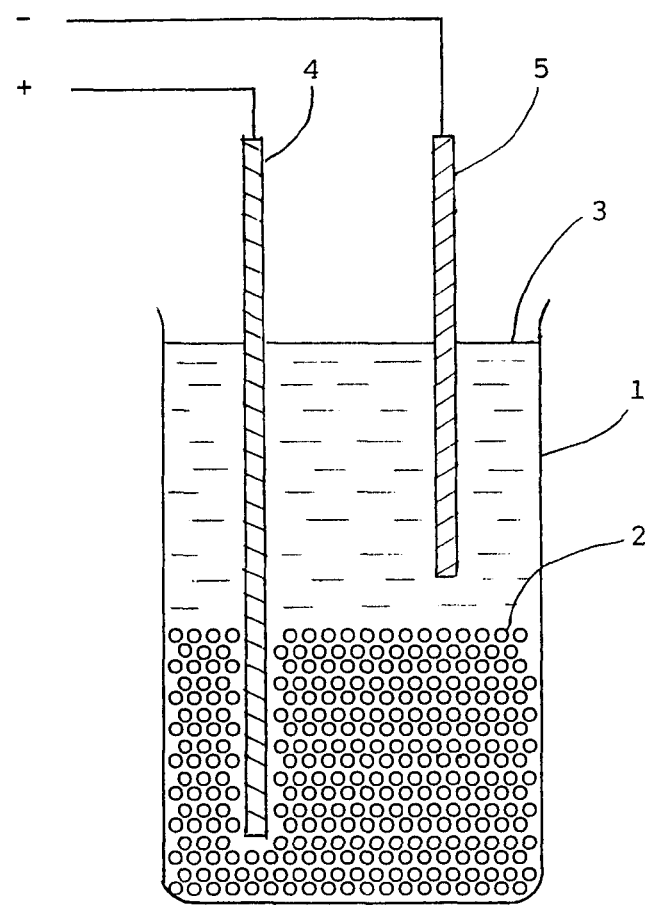

LITHIUM BROMIDE BATTERY

FIELD OF THE INVENTION

This disclosure describes a novel type of storage battery which is distinguished by its unique electrochemistry. Both positive and negative electrodes are fabricated from graphite. The electrolyte comprises an organic solution of lithium bromide. The solvent is selected from the group of esters of succinic acid and glutaric acid. Upon charging the cell, a carbon bromine compound is formed at the positive electrode and a lithium carbon compound is formed at the negative electrode.

BACKGROUND OF THE INVENTION

First commercialized in the early 1990's, lithium-ion batteries are now ubiquitous. They power everything from cell phones to laptop computers to electric cars. The rapid growth of this new type of battery was sparked by several advantages including higher energy density, relatively high cell voltage, and longer retention or shelf life.

There are many variations of lithium-ion batteries, but they all rely on the same basic chemistry. A positive electrode is made of an intercalation compound such as lithium cobalt oxide, and a negative electrode typically is lithium graphite. The electrolyte is a solution of a lithium salt such as lithium phosphorus fluoride dissolved in an aprotic organic solvent like propylene carbonate. During the operation of the cell as it is repeatedly charged and discharged, lithium ions shuttle back and forth between the positive and negative electrodes.

In spite of the success with lithium-ion batteries, these cells have a number of drawbacks. For one, they have a low rate of discharge or power capability. Second, they have limited cycle life. And finally, they have exhibited safety problems due to the flammability of their components. Not to be overlooked, the relative high cost of lithium-ion batteries has slowed their acceptance into new applications.

SUMMARY OF THE INVENTION

In view of the shortcomings of lithium-ion batteries, I have embarked upon the task of inventing a battery with substantially improved characteristics. My goal was to retain the best features of the lithium-ion battery but avoid or minimize its disadvantages.

In general, my new storage battery is fabricated so as to employ graphite for both positive and negative electrodes. The electrolyte is prepared by dissolving lithium bromide in a solvent selected from the group of esters of succinic acid and glutaric acid. The compounds include the methyl and ethyl esters.

During charging of the cell, bromine ions are attracted to the positive electrode forming a carbon bromine compound. At the same time, lithium ions migrate to the negative electrode to produce a lithium carbon compound. The process is reversed upon the discharge of the cell.

Various co-solvents may be employed in the electrolyte. These include acetone and diethyl ether. The configuration of the electrodes is not fixed. They may be in the form of sheets, fibers or particles in order to maximize the electrode surface area. As required, a separator may be employed between the positive and negative electrodes to isolate them electrically.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying photographs, the latter being briefly described hereinafter.

BRIEF SUMMARY OF THE DRAWINGS

The description herein makes reference to the accompanying drawings wherein like reference numerals refer to like parts throughout the several views and wherein:

FIG. 1 is a diagrammatic rendering of a prototype of the battery embodying the present invention. The principal components of the battery are illustrated in the FIGURE.

DETAILED DESCRIPTION OF THE ILLUSTRATIVE EMBODIMENT

The lithium bromide battery of the present invention comprises unique features that lead to its outstanding performance. Both the positive and negative electrodes are fabricated from graphite. During the operation of the battery, these electrodes form complexes. Specifically, the positive electrode upon charging the cell forms a bromine compound. At the same time, the negative electrode forms a lithium carbon compound. These reactions are illustrated by the following equations.

At the positive electrode $$C + Br^- \rightarrow CBr + e^- \quad\quad 1.$$

And at the negative electrode $$C + Li^+ + LiC \quad\quad 2.$$

Combining equations 1 and 2, the following expression is obtained for the overall operation.

$$2C + Br^- + Li^- \rightarrow CBr + LiC \quad\quad 3.$$

Upon discharge, these reactions are reversed.

In reality, the graphite compounds formed with bromine and lithium may differ in composition from the formulas shown above. For example, graphite reacts with lithium to give the compound $LiC_6$. Also, graphite forms the compound $C_8Br$ when exposed to bromine vapor.

The composition of the electrolyte is important to the success of the battery. This solvent is an aprotic organic compound characterized by its low reactivity with lithium. A further requirement is that the solvent provide good ionic conductivity. To meet the wide applications for the battery, the solvent should have a low melting point and high boiling point. Additionally, the solvent should be compatible with the other components of the cell.

To provide these and other advantages, I use a particular class of compounds comprising the esters of succinic and glutaric acids. Both of these acids are unique in that the anhydrides are ring compounds, one containing five atoms (succinic anhydride) and the other containing six atoms (glutaric anhydride). Because the ring compounds are stable, their formation is promoted.

The mechanism for the solvation of lithium bromide by esters of succinic and glutaric acids can be explained as follows:

$$(CH_2CO_2CH_3)_2 + LiBr \rightleftharpoons (CH_2CO)_2O + CH_3Br + LiOCH_3 \quad\quad 4.$$

Where $(CH_2CO_2CH_3)_2$ is dimethyl succinate, LiBr is lithium bromide, $(CH_2CO)_2O$ is succinic acid anhydride, $CH_3Br$ is methyl bromide, and $LiOCH_3$ is lithium methoxide.

Either the methyl or ethyl esters of the respective acids can be used. Dimethyl succinate has a melting point of 18.2° C. and boiling point of 195.9° C. Diethyl succinate melts at −21.3° C. and boils at 217.8° C. The melting point of diethyl glutarate is −23.8° C. and the boiling point is 233.7° C. Finally, the melting point of dimethyl glutarate is −37° C. and the boiling point is 213 to 215° C.

Various co-solvents may be used in the preparation of the electrolyte. For example, lithium bromide is reported to dissolve in acetone as well as acetonitrile. The salt also has limited solubility in diethyl ether. The advantages of using a co-solvent are several fold. The liquid range can be extended. Also, the viscosity can be reduced thereby improving ionic mobility.

The design of the lithium bromide battery of the present invention is flexible. Both electrodes are fabricated from graphite. These electrodes can take any shape. In addition, granular or powdered graphite can be used. One possible configuration is a bipolar cell. In this design, a bed of graphite particles is spaced between two graphite electrodes. The contact resistance between the particles controls the conductivity of the bed.

A prototype of the battery covered by the present invention is shown in FIG. 1. Comprising a single cell, the battery is fabricated from container 1 that holds a layer of graphite powder 2 and is filled with electrolyte 3. A positive electrode of graphite 4 extends down to the bottom of the battery making contact with the graphite powder. A negative electrode of graphite 5 is immersed in the electrolyte. Electrical leads are connected to the two electrodes.

The potential applications of the battery of the present invention are manifold. Lithium has the high energy content and the principal components of the battery; e.g., the graphite electrodes are light, thus providing a cell for mobile or portable uses. The power of the cell is exceptional and it can be recharged rapidly. These attributes and others ensure a competitive advantage to the battery.

EXAMPLE

A glass test tube 25 mm in diameter by 150 mm long was used for the cell. The bottom half of the test tube was covered with graphite powder, synthetic conducting grade, −200 mesh. The cell was filled with electrolyte prepared by dissolving 12.6 gm. lithium bromide in 50 ml. of diethyl succinate after sufficiently heating the solvent. Both electrodes were graphite rods 0.25 in. in diameter by 6 in. long. The positive electrode extended down the tube into the layer of graphite powder. The negative electrode had contact only with the electrolyte. After charging the cell at 45.0 volts with a current of 0.05 amp., the experimental cell achieved an open circuit potential of 3.51 volts.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A storage battery comprising:
   (a) positive electrode having a composition, when the battery is discharged, consisting essentially entirely of graphite and, when the battery is charged, consisting essentially entirely of carton bromide;
   (b) a negative electrode which when the battery is discharged has a composition consisting essentially entirely of graphite and, when the battery is charged has a composition consisting essentially of lithium carbide; and
   (c) an electrolyte comprising a solution of lithium bromide dissolved in a solvent selected from the group consisting of esters of succinic and glutaric acids.

2. A storage battery according to claim 1 wherein the electrolyte contains acetone.

3. A storage battery according to claim 1 wherein the electrolyte contains acetonitrile.

4. A storage battery according to claim 1 wherein the electrolyte contains diethyl ether.

5. A storage battery comprising at least one cell including:
   (a) a positive electrode having a submerged inner-cell portion and an exposed portion for access; said positive electrode having a composition consisting essentially entirely of graphite when the battery is charged and essentially entirely of carbon bromide when the battery is charged;
   (b) a negative electrode including a submerged inner-cell portion and an exposed portion for access; said negative electrode having a composition consisting essentially of graphite when the battery is discharged and essentially entirely of lithium carbide when the battery is charged;
   (c) an electrolyte within the cell and in contact with the inner-cell portions of the positive and negative electrodes; said electrolyte comprising a solution of lithium bromide dissolved in a solvent selected from the group consisting of esters of succinic and glutaric acids.

6. A storage battery as defined in claim 5 wherein the electrolyte contains diethyl ether.

7. A storage battery as defined in claim 5 wherein the cell includes a layer of graphite powder and the positive electrode extends into said graphite powder layer.

* * * * *